UNITED STATES PATENT OFFICE.

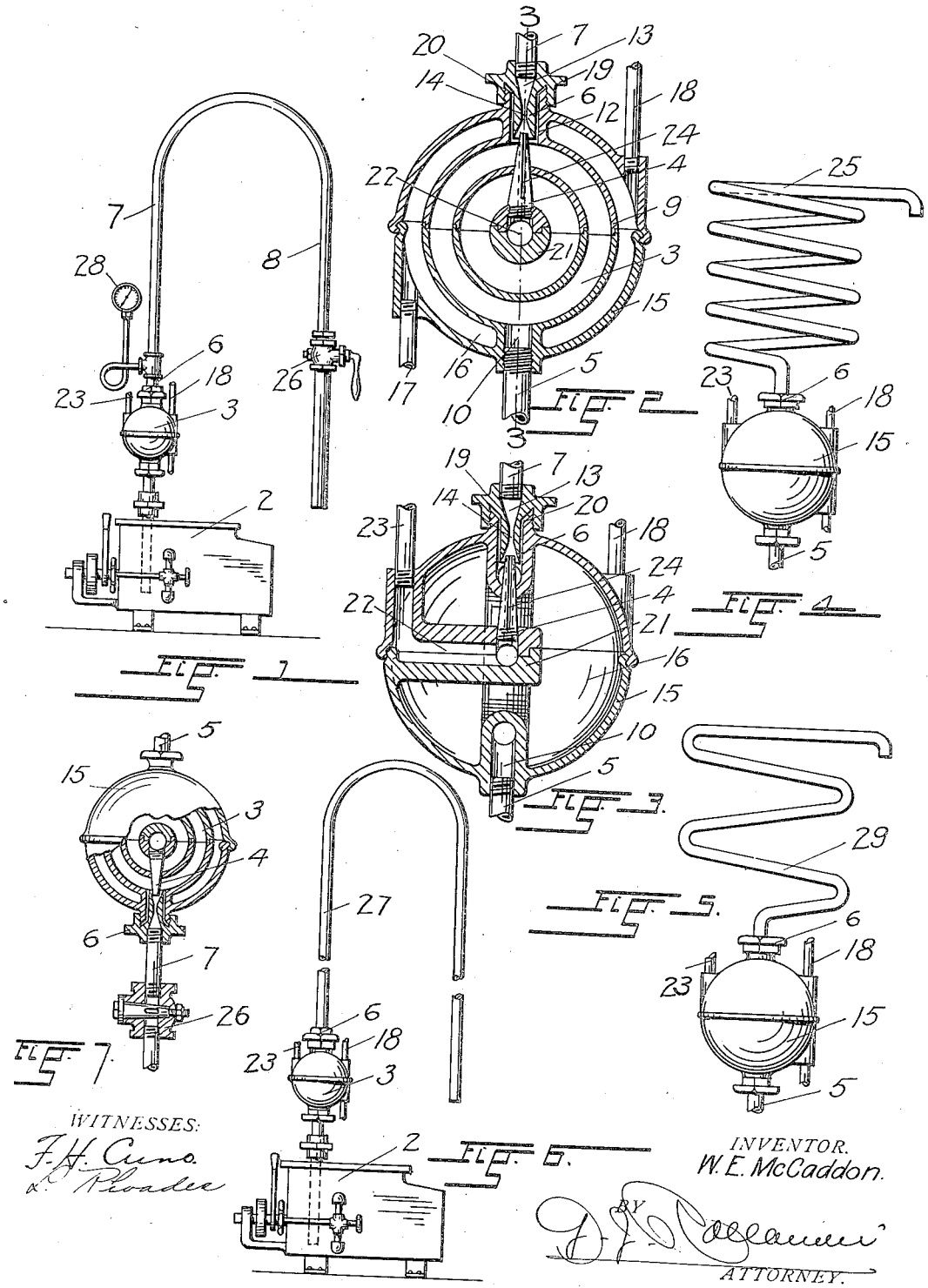

WILLIAM E. McCADDON, OF DENVER, COLORADO, ASSIGNOR TO HERBERT M. DE WITT, OF DENVER, COLORADO.

APPARATUS FOR PRODUCING CREAM.

1,094,082.  Specification of Letters Patent.  Patented Apr. 21, 1914.

Application filed April 16, 1913. Serial No. 761,493.

*To all whom it may concern:*

Be it known that I, WILLIAM E. McCADDON, a citizen of the United States, residing at Denver, in the county of Denver and State of Colorado, have invented certain new and useful Improvements in Apparatus for Producing Cream, of which the following is a specification.

This invention relates to apparatus adapted for the production of cream or imitations thereof from an emulsion of a milk product such as milk, skim-milk, milk powder or condensed milk, and a fat or oil such as butterfat, cottonseed oil or oleomargarin, by the process described in my application for Patent No. 722,066, filed September 24, 1912.

This process consists essentially in driving an emulsion of the milk product and the fat or oil against a determinate resistance, after it has been forced through a narrow passage for the purpose of separating its fatty particles, whereby the separated fatty globules and the milk product contained in the emulsion are commingled so intimately and thoroughly as to produce a product of cream-like consistency which is practically devoid of acidity and which for an extensive period will remain sweet and without separation of the substances of which it is composed.

Of the many methods suitable for producing the resistance above referred to I prefer, by reason of its simplicity and ease of adjustment, that in which the emulsion after it has been driven through the narrow passage in which its fatty particles are separated, is forced into and through a conduit, the flow through which is controlled by means of a valve of suitable construction which may be adjusted to vary the resistance to the progress of the emulsion in accordance with the character and proportions of its constituents, the strength of the impellent force, and other circumstances. The force required for impelling the fluid into and through the valve-controlled conduit and for forcing it through the narrow passage above referred to, I preferably produce by the action of a jet of steam or compressed air which by its ejection from a nozzle, creates a partial vacuum which causes the emulsion to be drawn from the receptacle in which the milk product and oil are disposed, upwardly through the before-mentioned passage and into an end of the conduit which at its opposite extremity has an outlet for the discharge of the product of the process, into the receptacles in which it is stored or transported.

In the practice of my process the emulsion is subjected to heat for the purpose of delivering the product in a sterilized condition and it is, for this reason, preferable that steam be used to produce the vacuum, as it will naturally aid in raising the matter under treatment to the temperature required for its sterilization.

In the accompanying drawings in the various views of which like parts are similarly designated, Figure 1 represents an elevation of the apparatus in its preferred form, Fig. 2, a vertical section of the vacuum chamber and adjoining parts of the apparatus, drawn to a larger scale, Fig. 3, a section taken along the line 3—3, Fig. 2, Figs. 4, 5 and 6, fragmentary views of the apparatus showing modified constructions of the means for producing the required resistance to the flow of liquid, and Fig. 7, a fragmentary view partially in section showing still another modification in the construction of the apparatus.

Referring first to Figs. 1, 2 and 3 of the drawings, the reference numeral 2 designates a vat of suitable construction in which the milk product and oil are initially combined, 3 a jacketed vacuum chamber in which a partial vacuum is produced by the ejection of steam through a nozzle 4, 5 the suction pipe through which the emulsion is drawn from the vat into the vacuum chamber, 6 a plug which provides the narrow throat through which the emulsion is forced for the purpose of finely dividing its fatty constituents, and 7 the conduit into which the emulsion after having passed through the throat is introduced to compel the ingredients thereof to commingle by the resistance produced by means of the valve 26 which is connected in the conduit at a point between its extremities.

To discharge the cream into the receptacles in which it is stored or transported, the upper extremity of the conduit is curved semi-circularly as shown in Fig. 1 of the drawings and continued in a downwardly extending leg 8.

The vat 2 in which the emulsion is contained may be of any suitable construction and it is preferably provided with an agitation mechanism by means of which the constituents of the emulsion are mixed before being drawn upwardly into the vacuum chamber 3. The latter is composed of a vertically disposed annular conduit 9 which at its lowest point has an inlet 10 which connects with the suction pipe 5 and which at a thereto diametrically opposite point, is provided with an outlet 12 which is occupied by the before-mentioned plug 6 whose axial bore 13 is contracted intermediate of its extremities to provide a narrow throat 14 through which the emulsion is forced for the purpose of dividing its fatty particles.

A globular casing 15 which surrounds the vacuum chamber, provides a jacket 16 through which, in the operation of the apparatus, water or other fluid is circulated for the purpose of reducing the temperature of the apparatus, and which to this end is provided at diagonally opposite points with a water inlet pipe 17 and a discharge pipe 18.

The plug 6 is, by means of an integral nut 19, screwed upon an upwardly extending nipple 20 on the casing 15, the upper end of its axial bore 13 is threaded to receive the correspondingly threaded extremity of the conduit and the opposite end of the said bore flares downwardly from its contracted throat 14 to admit the tip of the tapering nozzle 4 which is screwed into a threaded opening in a core 21 formed integral with the casing 15. The opening in which the nozzle is secured, communicates with an axial duct 22 in the core, which extends at right-angles to the said opening and which connects at its outer end with a pipe 23 through which the steam or compressed air is conducted to the nozzle from a conveniently located source of supply. The nozzle 4 has in its exterior surface, a plurality of longitudinally extending grooves 24 which provide passages for the emulsion from the vacuum chamber to the throat 14 in case the nozzle is by either its own adjustment or by that of the plug 6, brought in too close proximity to the surface of the bore 13 in the latter to allow a free and unobstructed upward flow of the fluid toward the conduit 7.

In the operation of my invention the milk-product and oil contained in the vat 2 are initially mixed by means of a suitable stirring apparatus and raised in temperature by heat applied to the vat in any convenient manner. The ejection of steam from the nozzle 4 creates a partial vacuum in the annular chamber 3 which causes the emulsion to be drawn from the vat 2 through the suction pipe 5 and through the chamber 3 into the bore 13 of the plug 6 to be forced through the narrow throat 14 in which the fatty constituents of the emulsion are separated. After having passed through the throat the finely divided substances are forced upwardly into the conduit 7 against the resistance produced by the partially closed valve and are thereby thoroughly commingled until they are discharged through the delivery leg 8 in the form of a cream. The degree of resistance obtained by partially closing the valve may be ascertained by the application of a pressure-gage 28 to the portion of the conduit between the valve and its end which connects with the vacuum chamber, as is shown in Fig. 1.

While the above described method of producing the required resistance to the flow of the emulsion, is preferable by reason of the simplicity of its construction and the ease with which it can be adjusted to provide any degree of resistance required, the same result may be obtained by various other means, the most practical ones of which have been shown in Figs. 4, 5 and 6 of the drawings.

In the construction shown in Fig. 4 the required resistance to the flow of liquid discharged from the vacuum chamber, which in the form of the apparatus shown in Fig. 1, is produced by means of the valve 26, is obtained by the use of a coiled pipe 25 which at its lower extremity is secured in the threaded upper portion of the bore in the plug 6, and in the modification illustrated in Fig. 5, a pipe 26 of zig-zag shape is fastened in the plug to provide a tortuous course for the liquid driven upwardly by the jet of steam, for the same purpose.

In the construction shown in Fig. 6, a stand-pipe 27 is connected with the plug, in which the emulsion is raised against its own weight to a determinate altitude which is varied in accordance with the elevation above sea-level of the locality where the process is carried out. The stand-pipe consists of a tube which at a point from eighteen to twenty feet above the surface upon which the apparatus is installed, is bent in a semi-circular curve and extended downwardly for the purpose of delivering the cream at a point of lower elevation.

In Fig. 7, the vacuum chamber has been drawn in an inverted position merely to point out the fact that the direction in which the valve-controlled conduit 7 extends, has no influence on the operation of the apparatus or the result obtained thereby.

While, as hereinabove explained, my process may be effectively used for the production of imitation cream from a milk-product and oleomargarin or other oil, it is particularly adapted to be employed for the production of cream from a milk-product such as skim-milk, condensed milk or milk powder, and butter-fat, and the product obtained by my process while being adapted for many different purposes, has been found to be of special value in the manufacture of ice cream and the like, more particularly at places where fresh cream is not available, or the supply thereof is limited.

While I have shown and described my invention in the best form at present known to me, I wish it understood that changes in the arrangement and construction of the parts of the apparatus other than the modifications hereinabove described and shown in the drawings, may be availed of within the scope of the following claims.

What I claim and desire to secure by Letters-Patent is:

1. In a device for producing cream and the like, a vacuum chamber having a suction opening and a discharge passage which is contracted to form a narrow throat and which from said throat flares inwardly, a nozzle connected with a source of fluid under pressure extending into the flaring portion of said passage and having, exteriorly, a plurality of longitudinal grooves, and conductive means connected with said passage.

2. In an apparatus for producing cream and the like, a jacketed vacuum chamber having a suction opening and a discharge-passage, a nozzle connected with a source of fluid under pressure, and disposed for the ejection of fluid into said passage, means for the circulation of a cooling fluid through the said jacket, and a conduit connected with said passage.

3. In an apparatus for producing cream and the like, an annular vacuum chamber having a suction opening and a discharge passage, a casing surrounding said chamber to provide a jacket, means on said casing for circulating a cooling fluid through said jacket, a core on said casing having a duct in connection with a source of fluid under pressure, a nozzle on said core in communication with said duct and disposed to eject fluid into said passage, and a conduit connected with said passage.

4. In an apparatus for producing cream and the like, a jacketed vacuum chamber having a suction opening and a discharge-passage, a nozzle connected with a source of fluid under pressure, and disposed for the ejection of fluid into said passage, means for the circulation of a cooling fluid through the said jacket, and conductive means connected with said passage to provide a resistance to the flow of liquid impelled through the same by the ejection of said fluid.

5. In an apparatus for producing cream and the like, an annular vacuum chamber having a suction opening and a discharge passage, a casing surrounding said chamber to provide a jacket, means on said casing for circulating a cooling fluid through said jacket, a core on said casing having a duct in connection with a source of fluid under pressure, a nozzle on said core, in communication with said duct and disposed to eject fluid into said passage, and conducting means connected with said passage to provide a resistance to the flow of liquid impelled through the same by the ejection of said fluid.

6. In an apparatus for producing cream and the like, a vacuum-chamber having a suction opening and a narrow discharge passage, a nozzle connected with a source of fluid under pressure and disposed to eject fluid into said passage, and a stand pipe erected in connection with said passage.

7. In an apparatus for producing cream and the like, a vacuum-chamber having a suction opening and a narrow discharge passage, a nozzle connected with a source of fluid under pressure and disposed to eject fluid into said passage, and a stand-pipe curved downwardly at its upper end and connected at its lower end with the said passage.

8. In an apparatus for producing cream and the like, a vacuum chamber having a suction opening and a discharge opening, a plug adjustably fitted in the last mentioned opening and having a bore contracted to provide a narrow throat, a nozzle connected with a source of fluid under pressure and disposed to eject fluid into said bore, and a conduit connecting with said plug.

9. In an apparatus for producing cream or the like, an annular vacuum chamber having at its lowest point, a suction opening and at a point opposite thereto, a narrow discharge passage, a nozzle connected with a source of fluid under pressure and extending through the inner wall of said chamber, to eject fluid into said passage, and a conduit connected with said passage.

10. In an apparatus for producing cream or the like, a casing, a vacuum chamber within said casing, having a suction opening and a narrow discharge passage, a nozzle connected with a source of fluid under pressure and held on said casing to eject fluid into said passage, means for the circulation of a cooling fluid through said casing, and a conduit connected with said passage.

In testimony whereof I have affixed my signature in presence of two witnesses.

WILLIAM E. McCADDON.

Witnesses:
E. S. PEDENE,
F. P. MURRAY.